(12) United States Patent
Marraud et al.

(10) Patent No.: US 9,275,140 B2
(45) Date of Patent: Mar. 1, 2016

(54) METHOD OF OPTIMIZING THE SEARCH FOR A SCENE ON THE BASIS OF A STREAM OF IMAGES ARCHIVED IN A VIDEO DATABASE

(75) Inventors: Denis Marraud, Issy les Moulineaux (FR); Benjamin Cepas, Paris (FR)

(73) Assignee: European Aeronautic Defence and Space Company—Eads France, Paris (FR)

( * ) Notice: Subject to any disclaimer, the term of this patent is extended or adjusted under 35 U.S.C. 154(b) by 369 days.

(21) Appl. No.: 13/120,340

(22) PCT Filed: Sep. 28, 2009

(86) PCT No.: PCT/EP2009/062507
§ 371 (c)(1),
(2), (4) Date: Jun. 7, 2011

(87) PCT Pub. No.: WO2010/037704
PCT Pub. Date: Apr. 8, 2010

(65) Prior Publication Data
US 2011/0228095 A1    Sep. 22, 2011

(30) Foreign Application Priority Data
Sep. 30, 2008 (FR) .................................. 08 56581

(51) Int. Cl.
*H04N 7/18* (2006.01)
*G06F 17/30* (2006.01)

(52) U.S. Cl.
CPC .... *G06F 17/30781* (2013.01); *G06F 17/30979* (2013.01)

(58) Field of Classification Search
CPC .................. G06F 17/30781; G06F 17/30979; G06K 9/00711
USPC ....................................................... 348/159
See application file for complete search history.

(56) References Cited

PUBLICATIONS

Kalyan Wadakkeveedu, et al., "A Content Based Video Retrieval Method for Surveillance and Forensic Applications", Proceedings of the SPIE 2007, XP-002524620, vol. 6560, Apr. 9, 2007, 11 pages.
Thi-Lan Le, et al., "A Framework for Surveillance Video Indexing and Retrieval", Content-Based Multimedia Indexing, XP031286384, Jun. 18, 2008, pp. 338-345.
Niels Haering, et al., "The Evolution of Video Surveillance: an Overview", Machine Vision and Applications, XP019651736, vol. 19, No. 5-6, Jun. 19, 2008, pp. 279-290.
International Search Report issued Nov. 3, 2009 in PCT/EP2009/062507 (with English translation).

*Primary Examiner* — Tat Chio
*Assistant Examiner* — Nguyen Truong
(74) *Attorney, Agent, or Firm* — Oblon, McClelland, Maier & Neustadt, L.L.P.

(57) ABSTRACT

A method of searching for a scene based on a stream of images archived in a video surveillance database including: a first phase of preprocessing prior to archiving of the images including extracting generic information from the images of the stream, systematically annotating the scenes of the images by at least one indication defined as a function of the generic information, and indexing the scenes of the images based on information extracted from the indications originating from one or more streams; a second phase of investigation by preselecting video segments from the stream of images including the annotation indications associated with the images; and a third phase of searching for a particular scene based on at least one additional characteristic not forming part of the annotations associated with the preselected video segments.

8 Claims, 1 Drawing Sheet

METHOD OF OPTIMIZING THE SEARCH FOR A SCENE ON THE BASIS OF A STREAM OF IMAGES ARCHIVED IN A VIDEO DATABASE

TECHNICAL FIELD

The invention relates to a method of optimizing the search for a scene in a stream of images archived in a video database.

The invention also relates to software stored on a recording medium and intended, when it is executed by a computer, to carry out the method, and a device suitable for carrying out the method.

BACKGROUND OF THE INVENTION

Video images are increasingly used in industrial applications for process monitoring and supervision and in video surveillance applications for public and private sites. These applications generally use a network of cameras carefully arranged so as to provide reliable images at different points of the monitored area. The images provided by the different cameras are compressed, then stored in a video database for later use. In most applications, in particular in the video surveillance field, this use requires that a large volume of video images be processed, in particular when the network includes a large number of cameras spread out over a large area, such as a town, for example. The quantity of stored images quickly becomes too large for an operator to be able to perform a quick and effective analysis of the images in order to extract the actions or objects that are relevant to the considered application.

In practice, an investigation may require viewing and/or processing several tens of thousands of hours of video. It is then difficult to find the desired information if no prior indexing of the videos was done upon acquisition. Furthermore, the videos available during the search are those that were stored, therefore compressed, and no longer have the optimal image quality for the richest possible extraction of information.

In the prior art, there are systems generating alarms on predefined events or indications. However, in some applications, the events and indications generating the alarms can be insufficient to quickly and effectively navigate through the archives looking for objects (individuals, vehicles) of a nature to provide relevant information. This is the case for example when looking for suspects in a crowd at various points of an area monitored by cameras.

One drawback of current video surveillance systems is related to the fact that they deal solely with current events and generate alarms for predefined events. The notion of "memory" of such a system is limited to the videos recorded and alarms detected.

The systems do not make it possible to find an event that did not generate an alarm when it occurred, but has become decisive in the context of a later investigation.

A first aim of the invention is to organize the memory of such systems so that they allow an effective investigation by limiting the amount of data to be analyzed by the operator, and by systematically annotating the streams of images obtained by the cameras in order to enable a quick selection of video sequences that are relevant for the investigation.

A second aim of the invention is to provide material tools and software enabling the operator to quickly and effectively navigate the video archives using systematic indexing making it possible to extract the information on the stream before compression to benefit from maximum image quality.

BRIEF DESCRIPTION OF THE INVENTION

The invention proposes a method of helping with the investigation in a video archive based on the generic and systematic annotation of streams, the filtering of irrelevant videos from generic requests, and on the selection of relevant videos from a targeted search.

The method according to the invention includes:
  a first phase of preprocessing prior to the archiving of said images comprising the following steps:
    extracting generic information from the images of said stream,
    systematically annotating the scenes of said images by at least one indication defined as a function of said generic information,
    indexing the scenes of said images on the basis of information extracted from said indications originating from one or more streams,
  a second phase of investigation by preselecting video segments from the stream of images comprising the annotation indications associated with said images, and
  a third phase of searching for a particular scene on the basis of at least one additional characteristic not forming part of the annotations associated with the preselected video segments.

Preferably, said third phase includes a training step making it possible to recognize said additional characteristic in the preselected video segments.

According to the invention, the third phase of searching for a particular scene is carried out using a generic request including said additional feature and the annotations associated with the preselected video segments. In this search phase, processing is applied to extract additional information on the preselected segments, and said additional information is compared to information contained in the training models for the searched specific characteristic.

According to another feature of the invention, the generic information extracted from said images is defined as a function of the considered use of the searched scene.

One possible application of the inventive method relates to searching for a particular scene in a stream of images obtained by a network of video surveillance cameras.

In that case, the annotation of the scenes from the stream of images obtained by the cameras is done independently, stream by stream, on each of the streams obtained by each camera of the video surveillance network.

In one embodiment, the annotation of said scenes is done by processing annotations associated with several distinct streams, either by the preprocessing unit, or by the processing unit.

In another embodiment of the invention, the annotation of said scenes can be done by merging annotations associated with several distinct streams. This embodiment is particularly adapted to a video surveillance application done by a system including several cameras, for example.

In a first alternative embodiment of the invention, the first preprocessing phase is carried out upon acquisition of the images.

In a second embodiment of the invention, the first preprocessing phase is carried out during archiving of the images.

The method is carried out by software stored on a recording medium and capable of being executed by a computer. This software includes:

a first module including instructions for carrying out a preprocessing phase prior to the archiving of said images, comprising the following steps:
- extracting generic information from the images of said stream,
- systematically annotating the scenes of said images by at least one indication defined as a function of said generic information,
- indexing the scenes of said images on the basis of information extracted from said indications originating from one or more streams, a second module including instructions for carrying out an investigation phase by preselecting video segments from the stream of images comprising the annotation indications associated with said images, and a third module including instructions for carrying out a phase of searching for a particular scene on the basis of at least one additional characteristic not forming part of the annotations associated with the preselected video segments.

Said software is capable of being implemented in a device for optimizing the search for a scene from a stream of images archived in a video database including:

a first unit intended to carry out a preprocessing phase prior to the archiving of said images, said first unit comprising:
- means for extracting generic information from the images of said stream,
- means for systematically annotating the scenes of said images by at least one indication defined as a function of said generic information,
- means for indexing the scenes of said images on the basis of information extracted from said indications originating from one or more streams, a second unit intended to carry out an investigation phase by preselecting video segments from the stream of images comprising the annotation indications associated with said images, and a third unit intended to carry out a phase of searching for a particular scene on the basis of at least one additional characteristic not forming part of the annotations associated with the preselected video segments.

BRIEF DESCRIPTION OF THE DRAWINGS

Other features and advantages of the invention will emerge from the following description, as a non-limiting example, in reference to the appended figures, in which.

DETAILED DESCRIPTION OF SPECIFIC EMBODIMENTS

Figure 1:
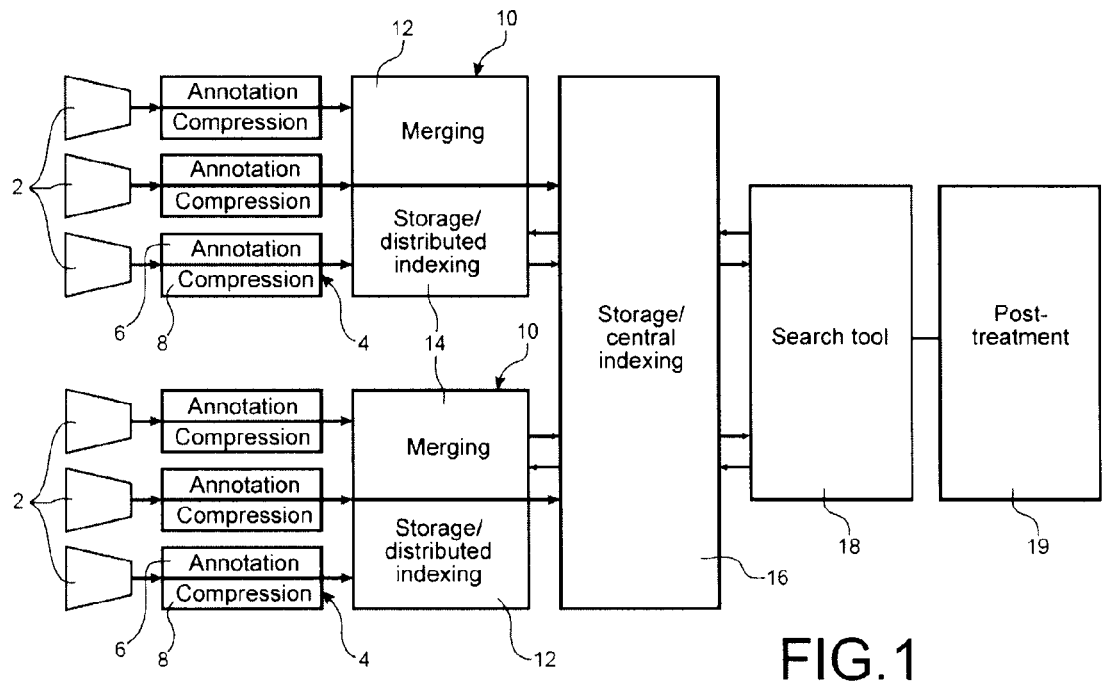
FIG. 1 diagrammatically illustrates a general architecture of an acquisition and image system in which the inventive method is carried out.

FIG. 1 diagrammatically illustrates a system for the acquisition and processing of images obtained by a network of cameras 2 in a video surveillance network, for example. The output of each camera 2 is connected to a first preprocessing unit 4 including an annotation module 6 and a compression module 8. The output of each preprocessing unit 4 is connected to a second preprocessing unit 10 including an annotation merging module 12 and a memory 14. The output of the second preprocessing unit 10 is connected to an indexing unit 16 that can be central or distributed and communicating with a search unit 18. The search unit 18 is also connected to a post-processing module 19 that takes on the training and the search for the specific characteristic being searched for.

During operation, the images obtained by a camera 2 are transmitted, before compression, to the first preprocessing unit 4 associated with it.

The annotation module 6 of the processing unit 4 includes software whereof the functions can be adapted to the contemplated application to add generic annotations to the images received from the camera.

Thus, in a video surveillance application, it may be a matter of detecting and characterizing moving objects (pedestrians, vehicles). The generic annotations are for example "pedestrians," "vehicles," the trajectories associated with the objects, characterization attributes, etc.

In an application for monitoring industrial processes, it may involve detecting and characterizing objects streaming past on a conveyor belt. In that case, the generic annotations are for example the shape or color of the objects. The annotation of the scenes is done by processing annotations associated with several distinct streams. It can be done independently stream by stream or by merging the annotations made on each stream, using the annotation merging module 12, annotations of several streams (multi-camera tracking in video surveillance, for example). The annotations can be extracted locally as close as possible to the cameras (within the preprocessing unit 4) or before indexing in the processing unit 12.

Once the annotation is defined and associated with the images, they are compressed, then stored in the memory 14.

The stored images then undergo systematic indexing in the indexing unit 16. This indexing makes it possible to quickly eliminate the images not corresponding to the search criteria specified by the operator during the investigation phase. Thus, if for example one is interested in a pedestrian in a video archive, all of the sequences only having cars will be automatically eliminated from the search. The navigation in the database can be optimized by a training phase for recognizing non-generic characteristics applied to the software of the preprocessing unit 4.

Thus for example if one is looking for an individual having an additional characteristic not of a generic nature, for example, "the individual being searched for is carrying a red backpack," the post-processing unit 19 can be configured to automatically select the sequences of pedestrians carrying a red backpack among the segments preselected based on generic characteristics (i.e. sequences of pedestrians).

This configuration is obtained by learning the notion of "presence of a red backpack" and will then be done and applied to the preselected videos.

In a multimedia application, it may involve cutting scenes into shots and characterizing each of the shots, etc.

Thus, when searching for sequences of a given actor in a movie archive, this search is preceded by a step for indexing and preselecting shots containing human beings, etc.

Figure 2:
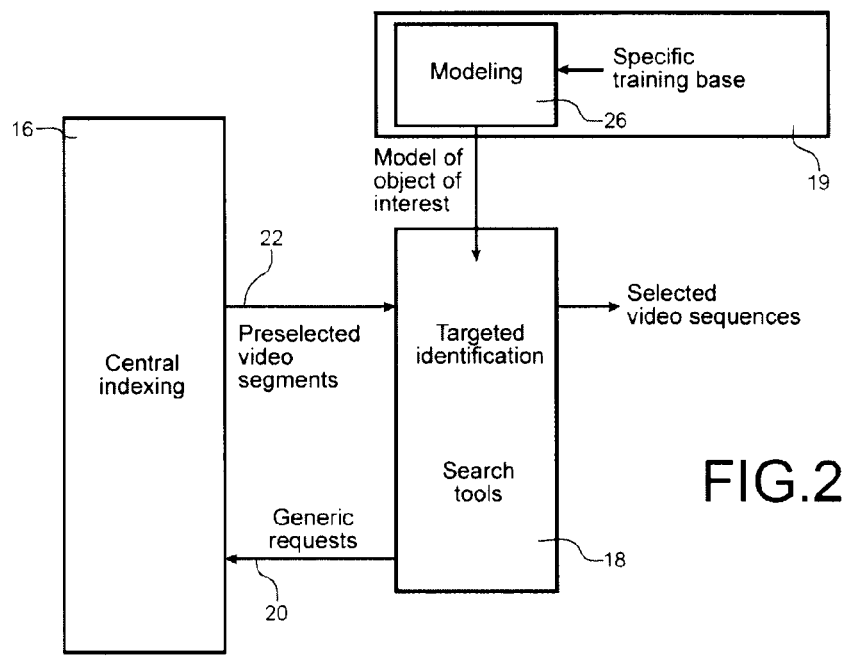
FIG. 2 shows a block diagram illustrating the essential steps of searching for video segments according to the invention.

FIG. 2 diagrammatically illustrates the steps of searching for a video segment from a database.

In step 20, the operator launches a search request for the video segment using the search unit 18. This request essentially includes generic criteria associated with the object searched for during the preprocessing phase.

In step 22, the indexing unit 16 searches for the object(s) meeting said generic criteria among the segments preselected during the preprocessing phase and transmits the segments found to the post-treatment unit 19.

If the object searched for has other non-generic characteristics, the search is then optimized using a model obtained from a modeling unit 26 included in the post-processing unit 19. The modeling unit 26 builds the models taking generic annotations and additional specific criteria into account.

The invention can be implemented in intelligent video surveillance systems able to be used in the context of investigations and more generally for all targeted searches in a video database (industrial viewing, multimedia, . . . ).

The method makes it possible to considerably reduce the number of operations necessary and the search times for particular individuals, vehicles, or events.

The invention claimed is:

1. A method of optimizing a search for a scene based on a stream of images archived in a video database, comprising:
  a first phase of preprocessing prior to archiving of the images, comprising:
    extracting generic information from the images of the stream,
    systematically annotating the scenes of the images by at least one indication defined as a function of the generic information, and
    indexing the scenes of the images based on information extracted from the indications originating from one or more streams;
  a second phase of investigation by preselecting video segments from the stream of images including the annotation indications associated with the images;
  a training making it possible to recognize at least one additional characteristic that is not part of the annotations associated with the preselected video segments; and
  a third phase of searching for a particular scene carried out using a generic request including the annotations associated with the preselected video segments and the at least one additional characteristic that is not part of said annotations, said at least one additional characteristic being a non-generic additional characteristic,
  wherein, during operation, the images obtained by a camera are transmitted, before compression, to a first preprocessing unit to dynamically add generic annotations to said images, and
  wherein the generic information extracted from the images is defined as a function of a considered application of the searched scene.

2. The method according to claim 1, wherein searching for a particular scene in a stream of images is obtained by a network of video surveillance cameras.

3. The method according to claim 2, wherein the annotation of the scenes is done independently, stream by stream, on each of the streams obtained by each camera of the video surveillance network.

4. The method according to claim 3, wherein the annotation of the scenes is done by processing annotations associated with plural distinct streams, either by a preprocessing unit, or by a processing unit.

5. The method according to claim 1, wherein the first preprocessing phase is carried out upon acquisition of the images.

6. The method according to claim 1, wherein the first preprocessing phase is carried out during archiving of the images.

7. A non-transitory computer-readable recording medium including computer executable instructions for optimizing a search for a scene from a stream of images archived in a video database that, when executed by a computer, cause the computer to:
  carry out, using circuitry, a preprocessing phase prior to archiving of the images, comprising:
    extracting generic information from the images of the stream,
    systematically annotating the scenes of the images by at least one indication defined as a function of the generic information, and
    indexing the scenes of the images based on information extracted from the indications originating from one or more streams;
  carry out, using the circuitry, an investigation phase by preselecting video segments from the stream of images including the annotation indications associated with the images, and to carry out a training phase making it possible to recognize at least one additional characteristic that is not part of the annotations associated with the preselected video segments; and
  carry out, using the circuitry, a phase of searching for a particular scene using a generic request including the annotations associated with the preselected video segments and the at least one additional characteristic that is not part of said annotations, said at least one additional characteristic being a non-generic additional characteristic,
  wherein, during operation, the images obtained by a camera are transmitted, before compression, to a first preprocessing unit to dynamically add generic annotations to said images, and
  wherein the generic information extracted from the images is defined as a function of a considered application of the searched scene.

8. A device for optimizing a search for a scene from a stream of images archived in a video database, comprising:
  circuitry configured to:
    carry out a preprocessing phase prior to archiving of the images, comprising:
      extracting generic information from the images of the stream,
      systematically annotating the scenes of the images by at least one indication defined as a function of the generic information, and
      indexing the scenes of the images based on information extracted from the indications originating from one or more streams;
    carry out an investigation phase by preselecting video segments from the stream of images including the annotation indications associated with the images, and
      to carry out a training phase making it possible to recognize at least one additional characteristic that is not part of the annotations associated with the preselected video segments; and
    carry out a phase of searching for a particular scene using a generic request including the annotations associated with the preselected video segments and the at least one additional characteristic that is not part of said annotations, said at least one additional characteristic being a non-generic additional characteristic,
  wherein, during operation, the images obtained by a camera are transmitted, before compression, to a first preprocessing unit to dynamically add generic annotations to said images, and
  wherein the generic information extracted from the images is defined as a function of a considered application of the searched scene.

* * * * *